United States Patent
Al-Nakhli et al.

(10) Patent No.: US 10,895,136 B2
(45) Date of Patent: Jan. 19, 2021

(54) METHODS FOR REDUCING CONDENSATION

(71) Applicants: Saudi Arabian Oil Company, Dhahran (SA); King Fahd University of Petroleum and Minerals, Dhahran (SA)

(72) Inventors: Ayman R. Al-Nakhli, Dammam (SA); Mohammed Abdullah Bataweel, Dhahran (SA); Mohamed Ahmed Nasr Eldin Mahmoud, Dhahran (SA); Amjed Mohammed Hassan, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/142,753

(22) Filed: Sep. 26, 2018

(65) Prior Publication Data
US 2020/0095853 A1    Mar. 26, 2020

(51) Int. Cl.
| | | |
|---|---|---|
| E21B 43/24 | (2006.01) | |
| C09K 8/592 | (2006.01) | |
| C09K 8/66 | (2006.01) | |
| C09K 8/68 | (2006.01) | |

(52) U.S. Cl.
CPC .............. *E21B 43/24* (2013.01); *C09K 8/592* (2013.01); *C09K 8/665* (2013.01); *C09K 8/68* (2013.01); *E21B 43/2405* (2013.01)

(58) Field of Classification Search
CPC ................................ E21B 43/24; C09K 8/592
USPC ........................................................ 166/300
See application file for complete search history.

(56) References Cited

U.S. PATENT DOCUMENTS

| | | | |
|---|---|---|---|
| 2,767,791 | A | 10/1956 | van Dijck |
| 3,654,131 | A | 4/1972 | Carr |
| 6,488,086 | B1 | 12/2002 | Daragan et al. |
| 9,803,133 | B2 | 10/2017 | Al-Nakhli et al. |
| 2003/0098605 | A1 | 5/2003 | Vinegar et al. |

(Continued)

FOREIGN PATENT DOCUMENTS

| | | |
|---|---|---|
| RU | 2030568 C1 | 3/1995 |
| WO | 2017117677 A1 | 7/2017 |

OTHER PUBLICATIONS

Afidick et al., "Production Performance of a Retrograde Gas Reservoir: A Case Study of the Arun Field" SPE Asia Pacific Oil and Gas Conference, Melbourne, Australia, 1994.

(Continued)

*Primary Examiner* — Zakiya W Bates
*Assistant Examiner* — Ashish K Varma
(74) *Attorney, Agent, or Firm* — Dinsmore & Shohl LLP

(57) ABSTRACT

A method for reducing condensate in a subsurface formation is disclosed. The method comprises introducing a first reactant and a second reactant into the subsurface formation. The first reactant and the second reactant produce an exothermic reaction that increases temperature and pressure in the subsurface formation to greater than a dew point of the condensate. Increasing the temperature and pressure in the subsurface formation to greater than the dew point of the condensate vaporizes, and thereby reduces, condensate in the subsurface formation.

13 Claims, 5 Drawing Sheets

(56) References Cited

U.S. PATENT DOCUMENTS

| | | |
|---|---|---|
| 2004/0146288 A1 | 7/2004 | Vinegar et al. |
| 2004/0244990 A1 | 12/2004 | Herr |
| 2009/0321071 A1 | 12/2009 | Zhang et al. |
| 2012/0012308 A1* | 1/2012 | Ziauddin .............. E21B 47/06 166/250.1 |
| 2013/0081811 A1 | 4/2013 | Billman |
| 2013/0126169 A1* | 5/2013 | Al-Nakhli .............. C09K 8/68 166/300 |
| 2013/0333878 A1 | 12/2013 | Stone, Jr. et al. |
| 2014/0090839 A1* | 4/2014 | AL-Nakhli ............ E21B 43/16 166/270 |
| 2015/0068749 A1 | 3/2015 | Wernimont |
| 2015/0175879 A1 | 6/2015 | Al-Nakhli et al. |
| 2016/0010441 A1* | 1/2016 | Stehle .................. C09K 8/524 166/300 |
| 2016/0084051 A1 | 3/2016 | Vinegar et al. |

OTHER PUBLICATIONS

Al-Anazi et al, "Gas Productivity Enhancement by Wettability Alteration of Gas-Condensate Reservoirs" European Formation Damage Conference held in Schevenigen, The Netherlands, May 30-Jun. 1, 2007.

Al-Anazi et al., "Laboratory Measurements of Condensate Blocking and Treatment for Both Low and High Permeability Rocks", SPE Annual Techical Conference and Exhibition, 2002.

Al-Anazi et al., "A Successful Methanol Treatment in a Gas-Condensate Reservoir: Field Application" Society of Petroleum Engineers, SPE80901, 2003.

Al-Nakhli et al., "In-Situ Generation of a New Technology Application for Heavy Oil Production", SPE Heavy Oil Conference and Exhibition held in Kuwait City, Kuwait, Dec. 6-8, 2016.

Barnum et al., "Gas Condensate Reservoir Behaviour: Productivity and Recovery Reduction Due to Codensation", SPE Annual Technical Conference and Exhibition, Dallas, Texas 1995.

Eilerts et al., "Integration of Partial Differential Equation for Transient Radial Flow of Gas-Condensate Fluids in Porous Structures", SPEJ 141, pp. 141-152, 1965.

Van Essen et al., "Materials for thermochemical storage: characterization of salt hydrates", ECN report M-13-001, 2013.

Van Essen et al., "Materials for thermochemical storage: characterization of magnesium sulfate", ECN report M-09-001, 2009.

Fevang, "Gas Condensate Flow Behavior and Sampling", Ph.D. Dissertation, University of Trondheim, 1995.

Fevang et al., "Modeling Gas Condensate Well Deliverability", SPE 30714, 1995.

Fevang et al., "Modeling Gas-Condensate Well Deliverability", SPE Reservoir Engineering, pp. 221-230, Nov. 1996.

Ghiri et al., "Gas Injection for Enhancement of Condensate Recovery in a Gas Condensate Reservoir", Energy Sources, Part A: Recovery, Utilization and Environmental Effects, vol. 37, pp. 799-806, 2015.

Jones et al., "Interpretation of Flowing Well Response in Gas-Condensate Wells", SPE Formation Evaluation, Sep. 1988.

Jones et al., "Interpretation of Pressure-Buildup Responses in Gas-Condensate Wells", SPE Formation Evaluation, pp. 93-104, Mar. 1989.

Karandish et al., "Wettability alteration in gas-condensate carbonate reservoir using anionic fluorinated treatment", Chemical Engineering Research and Design, vol. 93, pp. 554-564, 2015.

Kniazeff et al., "Two-Phase Flow of Volatile Hydrocarbons", SPEJ 37, Trans, AIME, 234, Mar. 1965.

Kumar et al., "Chemical Stimulation of Gas/Condensate Reservoirs", SPE102669, SPE Annual Technical Conference and Exhibition held in San Antonio, Texas, Sep. 24-27, 2006.

Odell et al., "Successfully Cycling a Low-Permeability, High-Yield Gas Condensate Reservoir", Pressure Maintenance, JPT 41, Trans. Aime 240, pp. 41-47, Jan. 1967.

Roebuck et al., "The Compositional Reservoir Simulator: Case IV—The Two-Dimensional Model", SPE Annual Meeting, Houston, Texas, 1968.

Roebuck et al., "The Compositional Reservoir Simulator: Case I—The Linear Model", SPEJ pp. 115-130, Mar. 1969.

Sharifzadeh et al., "Preparation of the modified limestone possessing higher permeability of gas well based on fluorinated silica: Effect of catalyst", Journal of Florine Chemistry, vol. 173, pp. 35-46, 2015.

Zondag et al., "First studies in reactor concepts for Thermochemical Storage", ECN report M-09-008, 2009.

International Search Report and Written Opinion dated Jul. 16, 2019 pertaining to International application No. PCT/US2019/031239 filed May 8, 2019, 16 pgs.

Hassan et al. "Effect of In-Situ Generation of Heat and Pressure on Phase Behavior of Gas Condensate" Society of Petroleum Engineers Kingdom of Saudi Arabia Annual Technical Symposium and Exhibition, Apr. 23, 2018.

* cited by examiner

METHODS FOR REDUCING CONDENSATION

TECHNICAL FIELD

The present disclosure relates to natural resource well drilling and hydrocarbon production and, more specifically, to methods for reducing condensate.

BACKGROUND

The discovery and extraction of hydrocarbons, such as oil or natural gas, from subsurface formations, may be impeded for a variety of reasons, such as condensate formation in the subsurface formation. Condensate forms in subsurface formations when the downhole pressure drops to less than the dew point pressure. This may lead to a decreased rate of production of hydrocarbons from a hydrocarbon-producing region of the subsurface formation compared to the expected rate of production. In these instances, methods for reducing condensate in the subsurface formation can be utilized to improve hydrocarbon production. Conventional techniques include gas injection, water-alternating gas, hydraulic fracturing, and side-tracking. The optimal application of each type depends on subsurface formation temperature, pressure, depth, net pay, permeability, residual oil and water saturations, porosity, and hydrocarbon composition. However, these methods are time-consuming and do not result in permanent condensate removal.

SUMMARY

Accordingly, a continuing need exists for efficient methods for reducing condensate in a subsurface formation that result in permanent condensate removal. The present disclosure is directed to compositions and methods for reducing condensate utilizing thermochemical reactions. These thermochemical reactions increase the temperature and pressure in the subsurface formation, vaporizing the condensate and leading to the creation of micro fractures in the subsurface formation, increasing permeability and decreasing condensate banking at the wellbore.

In accordance with one or more embodiments of the present disclosure, a method for reducing condensate in a subsurface formation is disclosed. The method includes introducing a first reactant and a second reactant into the subsurface formation. The first reactant and the second reactant produce an exothermic reaction that increases temperature and pressure in the subsurface formation to greater than a dew point of the condensate. Increasing the temperature and pressure in the subsurface formation to greater than the dew point of the condensate vaporizes and thereby reduces condensate in the subsurface formation.

Additional features and advantages of the described embodiments will be set forth in the detailed description which follows. The additional features and advantages of the described embodiments will be, in part, readily apparent to those skilled in the art from that description or recognized by practicing the described embodiments, including the detailed description which follows as well as the drawings and the claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
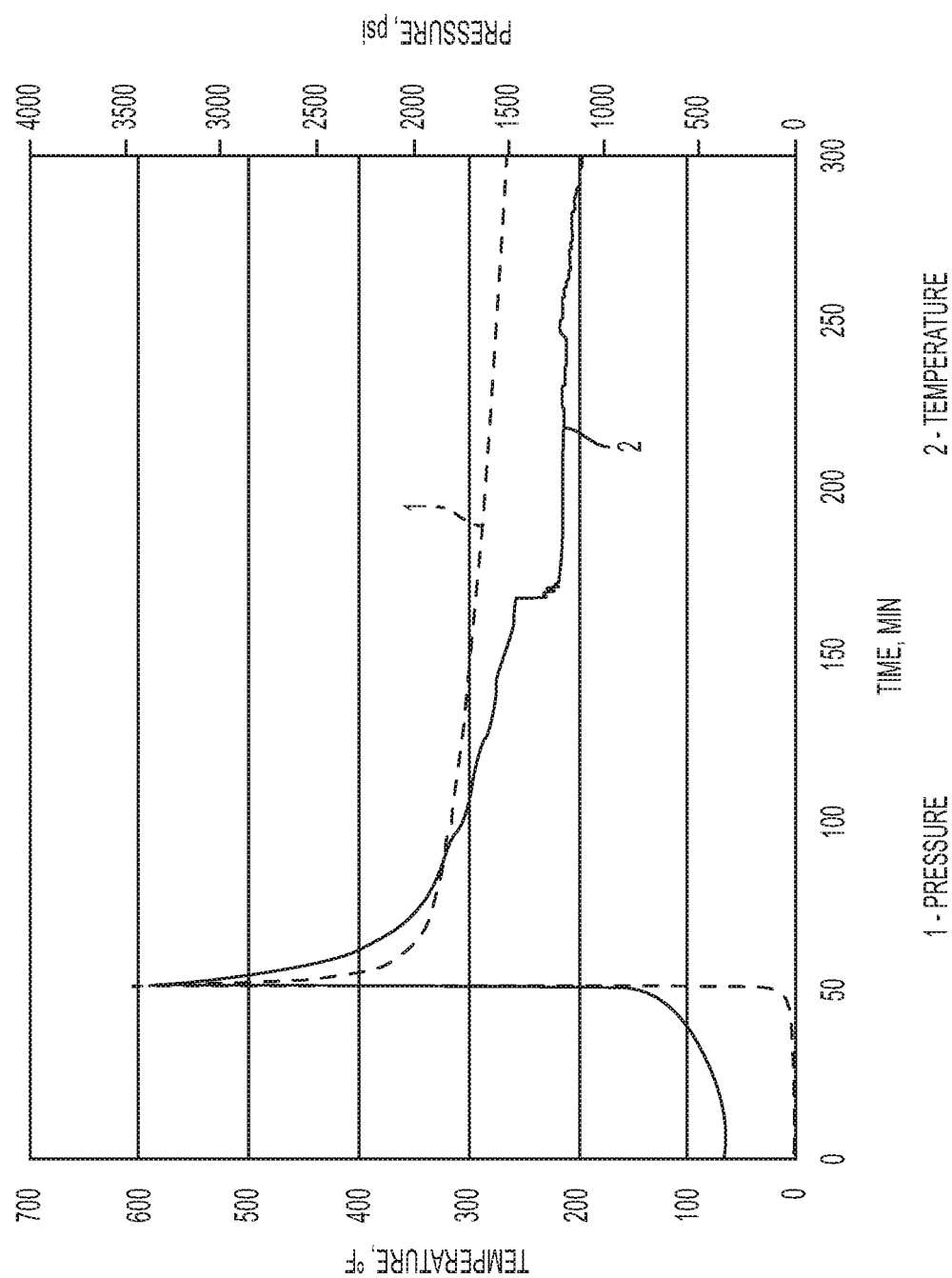
FIG. 1 graphically depicts the relationship between temperature (y-axis) and time (x-axis), and pressure (y-axis) and time (x-axis), during a fluid reaction experiment in which two reactants were injected into a reactor cell to interact and generate the temperature and pressure, according to one or more embodiments described in this disclosure.

As used throughout this disclosure, the term "annulus" refers to the space between two concentric objects, such as between the wellbore and casing, between the wellbore and drillpipe, or between casing and tubing, where fluid can flow.

As used throughout this disclosure, the term "condensate" refers to a liquid hydrocarbon phase that generally occurs in association with natural gas. Its presence as a liquid phase depends on temperature and pressure conditions in the reservoir allowing condensation of liquid from vapor. The API gravity of condensate is typically from 50° to 120°.

As used throughout this disclosure, the term "condensate banking" refers to a relative permeability effect where condensate drops out of the vapor phase around the wellbore when the pressure drops to less than the dew point in response to drawdown or depletion. Gas production rate may be severely reduced by the permeability reduction.

As used throughout this disclosure, the term "coreflooding system" refers to a coreholder vessel equipped to conduct coreflooding experiments and measurements, including coreflooding gelation time testing.

As used throughout this disclosure, the term "coreholder" refers to a vessel designed to withstand elevated temperatures and pressures, such as up to 300° C. and 20,000 pounds per square inch (psi) (137,895 kilopascals (kPa); 1 psi=6.89476 kPa), and to test core samples at these elevated temperatures and pressures.

As used throughout this disclosure, the term "core sample" refers to a plug, or sample, taken from a whole core from a subsurface formation for analysis. Core samples are conventionally 1 to 1.5 in. (2.5 to 3.8 centimeters (cm); 1 in.=2.54 cm) in diameter and 1 to 2 inches (in.) (5 cm) long. Core samples are conventionally cut perpendicular to the axis of the core or parallel to the axis, which form horizontal and vertical samples, respectively, when cut from a vertical wellbore. Conventional core sample analysis is conducted in a coreholder.

As used throughout this disclosure, the term "dew point" refers to the pressure at which the first condensate liquid comes out of a gas solution.

As used throughout this disclosure, the term "hydraulic fracturing" refers to a stimulation treatment routinely performed on hydrocarbon wells in low-permeability reservoirs, such as reservoirs with a permeability of less than 10 milliDarcys (mD). Hydraulic fracturing fluids are pumped into a subsurface formation, causing a fracture to form or open. The wings of the fracture extend away from the wellbore in opposing directions according to the natural stresses within the subsurface formation. Proppant are mixed with the treatment fluid to keep the fracture open when the treatment is complete. Hydraulic fracturing creates communication with a subsurface formation and bypasses damage, such as condensate banking, that may exist in the near-wellbore area.

As used in this disclosure, the term "sidetracking" refers to drilling a secondary wellbore away from an original wellbore. Sidetracking may involve bypassing an unusable section of the original wellbore that is no longer efficient to produce from due to various production problems, such as condensate banking. The sidetrack wellbore is conventionally drilled parallel to the original well.

As used in this disclosure, the term "spacer fluid" refers to a liquid used to physically separate one special-purpose liquid from another. Special purpose liquids may include drilling fluids, fracturing fluids, and chemical treatment fluids.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar properties throughout the subsurface formation, including, but not limited to, porosity and permeability. A subsurface formation is the fundamental unit of lithostratigraphy.

As used throughout this disclosure, the term "packer" refers to a device that can be run into a wellbore with an initial outside diameter smaller than the wellbore which then expands externally to seal the wellbore. The packer isolates the annulus, enabling controlled production, injection, or treatment.

As used throughout this disclosure, the term "producing subsurface formation" refers to the subsurface formation from which hydrocarbons are produced.

As used throughout this disclosure, the term "reservoir" refers to a subsurface formation having sufficient porosity and permeability to store and transmit fluids.

As used throughout this disclosure, the term "viscous fingering" refers to a phenomena whereby the interface of two fluids, in which one fluid has a lesser viscosity than the other, such as a difference of more than 5 centiPoise (cP), 10 cP, 20 cP, or 50 cP, and bypasses sections of the porous media as it moves along, creating an uneven, or fingered, profile. Fingering is a relatively common condition when injecting solutions with a viscosity of less than 10 cP into porous media.

As used throughout this disclosure, the term "water-alternating gas" refers to a condensate removal technique in which water and gas are alternately injected into the subsurface formation.

As used throughout this disclosure, the term "wellbore" refers to the drilled hole or borehole, including the openhole or uncased portion of the well. Borehole may refer to the inside diameter of the wellbore wall, the rock face that bounds the drilled hole.

The present disclosure is directed to methods for reducing condensate in a subsurface formation, in particular to methods for increasing the temperature and pressure in the producing subsurface formation. In hydrocarbon gas production, natural subsurface formation energy displaces hydrocarbons from the subsurface formation into the wellbore and up to the surface. Throughout production, the subsurface formation pressure will decrease and, eventually, condensate will drop out of the hydrocarbon gas. An increase in subsurface formation pressure would cause this condensate to revert back to its gaseous phase, increasing the production of the hydrocarbons present in the subsurface formation. The present method includes introducing a first reactant and a second reactant into the subsurface formation. In some embodiments, the method may include introducing the first reactant and the second reactant into the producing subsurface formation. The first reactant and the second reactant produce an exothermic reaction that increases temperature and pressure in the subsurface formation to greater than a dew point of the condensate. Increasing the temperature and pressure in the subsurface formation to greater than the dew point of the condensate vaporizes and thereby reduces condensate in the subsurface formation.

Introducing the first reactant and the second reactant into the subsurface formation may include introducing each reactant into the subsurface formation separately. In another embodiment, introducing the first reactant and the second reactant into the subsurface formation may include introducing the first reactant into the subsurface formation through coiled tubing and introducing the second reactant into the subsurface formation through an annulus of a wellbore.

In some embodiments, the first reactant may be included in an aqueous mixture. The aqueous mixture may include from 10 to 60 weight percent (wt. %), from 10 to 50 wt. %, from 10 to 40 wt. %, from 10 to 35 wt. %, from 10 to 30 wt. %, from 10 to 25 wt. %, from 10 to 20 wt. %, from 20 to 60 wt. %, from 20 to 50 wt. %, from 20 to 40 wt. %, from 20 to 35 wt. %, from 20 to 30 wt. %, from 20 to 25 wt. %, from 25 to 60 wt. %, from 25 to 50 wt. %, from 25 to 40 wt. %, from 25 to 35 wt. %, from 25 to 30 wt. %, from 30 to 60 wt. %, from 30 to 50 wt. %, from 30 to 40 wt. %, from 30 to 35 wt. %, from 35 to 60 wt. %, from 35 to 50 wt. %, from 35 to 40 wt. %, from 40 to 60 wt. %, from 40 to 50 wt. %, or from 50 to 60 wt. % of the first reactant as calculated by a weight of the mixture. Furthermore, the aqueous mixture may include one or more of fresh water, salt water, brine, municipal water, formation water, produced water, well water, filtered water, distilled water, sea water, other types of water, or combinations of waters.

In some embodiments, the second reactant may be included in an aqueous mixture. The mixture may comprise from 5 to 50 wt. %, from 5 to 40 wt. %, from 5 to 30 wt. %, from 5 to 25 wt. %, from 5 to 20 wt. %, from 5 to 15 wt. %, from 5 to 10 wt. %, from 10 to 50 wt. %, from 10 to 40 wt. %, from 10 to 35 wt. %, from 10 to 30 wt. %, from 10 to 25 wt. %, from 10 to 20 wt. %, from 10 to 15 wt. %, from 15 to 50 wt. %, from 15 to 40 wt. %, from 15 to 30 wt. %, from 15 to 25 wt. %, from 15 to 20 wt. %, from 20 to 50 wt. %, from 20 to 40 wt. %, from 20 to 30 wt. %, from 20 to 25 wt. %, from 25 to 50 wt. %, from 25 to 40 wt. %, from 25 to 30 wt. %, from 30 to 50 wt. %, from 30 to 40 wt. %, from 40 to 60 wt. %, or from 40 to 50 wt. % of the second reactant as calculated by a weight of the mixture.

Introducing the first reactant and the second reactant into the subsurface formation may include introducing a mixture comprising the first reactant and the second reactant into the subsurface formation. The mixture comprising the first reactant and the second reactant may include from 10 to 60 wt. %, from 10 to 50 wt. %, from 10 to 40 wt. %, from 10 to 35 wt. %, from 10 to 30 wt. %, from 10 to 25 wt. %, from 10 to 20 wt. %, from 20 to 60 wt. %, from 20 to 50 wt. %, from 20 to 40 wt. %, from 20 to 35 wt. %, from 20 to 30 wt. %, from 20 to 25 wt. %, from 25 to 60 wt. %, from 25 to 50 wt. %, from 25 to 40 wt. %, from 25 to 35 wt. %, from 25 to 30 wt. %, from 30 to 60 wt. %, from 30 to 50 wt. %, from 30 to 40 wt. %, from 30 to 35 wt. %, from 35 to 60 wt. %, from 35 to 50 wt. %, from 35 to 40 wt. %, from 40 to 60 wt. %, from 40 to 50 wt. %, or from 50 to 60 wt. % of the first and second reactants combined as calculated by a weight of the mixture. In some embodiments, the mixture is aqueous.

The method may further include introducing a buffer solution with the first and second reactants into the subsurface formation. Use of a buffer solution delays the exothermic reaction until the reactants are within the subsurface formation. The buffer solution may include at least one of citric acid, acetic acid, monopotassium phosphate, N-cyclohexyl-2-aminoethanesulfonic acid, and borate. The buffer solution may have be soluble in water, may have a very low absorbance of from 240 nanometers (nm) to 700 nm, and may have a pKa value of from 6.0 and 8.0, where the pKa value represents the acid dissociation constant at logarithmic scale.

The method may further include introducing nitrogen, $N_2$, with the first reactant and the second reactant into the subsurface formation. Introducing nitrogen with the reactants helps generate uniform fluid distributions, leading to controllable fluid mobility and preventing viscous fingering. The addition of nitrogen provides heat insulation within the subsurface formation, leading to increased heating efficiency. The addition of nitrogen may reduce up to 5%, 10%, 15%, 20%, 25%, 40%, or 50% of heat loss from the reaction. The addition of nitrogen may reduce from 5% to 25% of heat loss from the reaction.

Among other benefits, the exothermic reaction increases the porosity and permeability of the subsurface formation. The exothermic reaction forms microfractures within the subsurface formation, which reduces the likelihood of condensate banking forming in the wellbore. Furthermore, the increased temperature and pressure decreases the viscosity of the condensate and increases fluid mobility downhole. Gas injection, water-alternating gas, hydraulic fracturing, and side-tracking are conventional methods used to decrease condensate banking. However, although hydraulic fracturing increases the permeability of the subsurface formation near the wellbore, it does not increase the pressure of the reservoir and does not remove the condensate. Similarly, gas injection, sidetracking, and water-alternating gas each remove the condensate temporarily. However, these techniques do not remove the condensate permanently, as they do not form microfractures within the subsurface formation and the permeability of the subsurface formation remains unchanged. Other benefits may be realized by the methods and compositions described in this disclosure.

As previously discussed in this disclosure, the method includes introducing a first reactant and a second reactant into the subsurface formation. The basic reaction that controls heat generation or storage is:

$$A(\text{liquid/gas}) + B(\text{liquid/gas}) \Leftrightarrow C(\text{gas}) + Q(\text{heat}) \quad \text{EQUATION 1}$$

In one embodiment, at least one of the first reactant and the second reactant comprises a salt hydrate. A salt hydrate is a crystalline salt molecule that is attached to a certain number of water molecules, such that the water molecules are incorporated into the crystalline structure of the salt. In some embodiments, the salt hydrate may be chosen from the group consisting of $MgSO_4.7H_2O$, $Al_2SO_4.18H_2O$, $MgCl_2.6H_2O$, $CaCl_2.2H_2O$, $NaNO_2$, and $NH_4Cl$. In another embodiment, the first reactant and second reactants may comprise a salt. Specifically, the salt may be an acid salt, which is acidic after being dissolved in a solvent. In one embodiment, the first reactant comprises sodium nitrite, $NaNO_2$, and the second reactant comprises ammonium chloride, $NH_4Cl$. In this embodiment, specifically, the reaction that controls heat generation is:

$$NH_4Cl + NaNO_2 \rightarrow N_2(g) + NaCl + 2H_2O + \text{Heat} \quad \text{EQUATION 2}$$

Various other acid salts include $NaHCO_3$, $NaHSO_4$, $NaH_2PO_4$, and $Na_2HPO_4$. Each reactant may have a heat capacity of greater than 8,000 J/kg° C. Each reactant may have a heat capacity of greater than 2,000 J/kg° C., greater than 5,000 J/kg° C., greater than 7,000 J/kg° C., or greater than 10,000 J/kg° C.

Referring again to Equation 1, the exothermic reaction of these reactants results in steam and heat. These reaction products created by the exothermic reaction increase the temperature and pressure within the subsurface formation, vaporizing the condensate such that the reservoir contains only a single gas phase. The exothermic reaction increases the pressure in the subsurface formation. In some embodiments, the increased pressure ranges from 3,500 to 10,000 psi. The increased pressure may range from 1,000 to 20,000 psi, from 1,000 to 10,000 psi, from 1,000 to 7,000 psi, from 1,000 to 5,000 psi, from 1,000 to 3,500 psi, from 1,000 to 3,000 psi, from 1,000 to 2,000 psi, from 1,000 to 1,500 psi, from 1,500 to 20,000 psi, from 1,500 to 10,000 psi, from 1,500 to 7,000 psi, from 1,500 to 5,000 psi, from 1,500 to 3,500 psi, from 1,500 to 3,000 psi, from 1,500 to 2,000 psi, from 2,000 to 20,000 psi, from 2,000 to 10,000 psi, from 2,000 to 7,000 psi, from 2,000 to 5,000 psi, from 2,000 to 3,500 psi, from 2,000 to 3,000 psi, from 3,000 to 20,000 psi, from 3,000 to 10,000 psi, from 3,000 to 7,000 psi, from 3,000 to 5,000 psi, from 3,000 to 3,500 psi, from 3,500 to 20,000 psi, from 3,500 to 10,000 psi, from 3,500 to 7,000 psi, from 3,500 to 5,000 psi, from 5,000 to 20,000 psi, from 5,000 to 10,000 psi, or from 5,000 to 7,000 psi. In some embodiments, the pressure may increase by at least 100 psi, at least 200 psi, at least 500 psi, at least 800 psi, at least 1,000 psi, at least 1,200 psi, at least 1,500 psi, at least 1,700 psi, at least 2,000 psi, at least 2,500 psi, or at least 3,000 psi.

The exothermic reaction increases the temperature in the subsurface formation. In some embodiments, the increased temperature ranges from 300° F. to 750° F. The increased temperature may range from 200° F. to 1,000° F., from 200° F. to 750° F., from 200° F. to 500° F., from 200° F. to 300° F., from 200° F. to 250° F., from 250° F. to 1,000° F., from 250° F. to 750° F., from 250° F. to 500° F., from 250° F. to 300° F., from 300° F. to 1,000° F., from 300° F. to 750° F., from 300° F. to 500° F., or from 500° F. to 750° F. In some embodiments, the temperature may increase by 25° F., by 50° F., by 75° F., by 100° F., by 125° F., by 130° F., by 150° F., by 175° F., by 200° F., by 250° F., or by 300° F.

The exothermic reaction increases the permeability of the subsurface formation by creating microfractures in the subsurface formation due to the increased pressure. The permeability may increase at least 20 mD, at least 50 mD, at least 75 mD, at least 90 mD, at least 100 mD, at least 110 mD, at least 120 mD, at least 150 mD, at least 200 mD, at least 300 mD, or at least 500 mD.

The exothermic reaction may produce from 100,000 to 200,000 kiloJoules per barrel of total reactant (kJ/bbl), where total reactant includes the first and second reactant. The exothermic reaction may produce from 50,000 to 300,000 kJ/bbl, from 50,000 to 200,000 kJ/bbl, from 50,000 to 150,000 kJ/bbl, from 50,000 to 100,000 kJ/bbl, from 100,000 to 300,000 kJ/bbl, from 100,000 to 200,000 kJ/bbl, from 100,000 to 150,000 kJ/bbl, from 150,000 to 300,000 kJ/bbl, from 150,000 to 200,000 kJ/bbl, or from 200,000 to 300,000 kJ/bbl. The exothermic reaction may produce 144,000 kJ/bbl. The energy from one barrel of total reactants may be equivalent to the energy of from 1 to 5 bbl, of from 1 to 4 bbl, of from 1 to 3 bbl, of from 1 to 2.5 bbl, of from 1 to 2 bbl, of from 1 to 1.5 bbl, of from 1.5 to 5 bbl, of from 1.5 to 4 bbl, of from 1.5 to 3 bbl, of from 1.5 to 2.5 bbl, of from 1.5 to 2 bbl, of from 2 to 5 bbl, of from 2 to 4 bbl, of from 2 to 3 bbl, of from 2 to 2.5 bbl, of from 2.5 to 5 bbl, of from 2.5 to 4 bbl, of from 2.5 to 3 bbl, of from 3 to 5 bbl, of from 3 to 4 bbl, of from 4 to 5 bbl, or of 1.82 bbl of conventional steam injections at the same conditions. Therefore, the amount of total reactants needed for the disclosed method may be from 20% to 80% less, from 20% to 60% less, from 20% to 50% less, from 20% to 45% less, from 20% to 40% less, from 20% to 30% less, from 30% to 80% less, from 30% to 60% less, from 30% to 50% less, from 30% to 45% less, from 30% to 40% less, from 40% to 80% less, from 40% to 60% less, from 40% to 50% less, from 40% to 45% less, from 45% to 80% less, from 45% to 60% less, from 45% to 50% less, from 50% to 80% less, from 50% to 60% less, from 60% to 80% less, or 45% less than the amount of steam needed for conventional steam injection treatments.

The dew point of the condensate includes both a dew temperature and a dew pressure. The dew temperature may range from 50° F. to 400° F., from 50° F. to 300° F., from 50° F. to 250° F., from 50° F. to 200° F., from 50° F. to 150° F., from 50° F. to 100° F., from 100° F. to 400° F., from 100° F. to 300° F., from 100° F. to 250° F., from 100° F. to 200° F., from 100° F. to 150° F., from 150° F. to 400° F., from 150° F. to 300° F., from 150° F. to 250° F., from 150° F. to 200° F., from 200° F. to 400° F., from 200° F. to 300° F., from 200° F. to 250° F., from 250° F. to 400° F., from 250° F. to 300° F., or from 300° F. to 400° F. The dew pressure may range from 500 to 5000 psi, from 500 to 4000 psi, from 500 to 3500 psi, from 500 to 3000 psi, from 500 to 2500 psi, from 500 to 2000 psi, from 500 to 1500 psi, from 500 to 1000 psi, from 1000 to 5000 psi, from 1000 to 4000 psi, from 1000 to 3500 psi, from 1000 to 3000 psi, from 1000 to 2500 psi, from 1000 to 2000 psi, from 1000 to 1500 psi, from 1500 to 5000 psi, from 1500 to 4000 psi, from 1500 to 3500 psi, from 1500 to 3000 psi, from 1500 to 2500 psi, from 1500 to 2000 psi, from 2000 to 5000 psi, from 2000 to 4000 psi, from 2000 to 3500 psi, from 2000 to 3000 psi, from 2000 to 2500 psi, from 2500 to 5000 psi, from 2500 to 4000 psi, from 2500 to 3500 psi, from 2500 to 3000 psi, from 3000 to 5000 psi, from 3000 to 4000 psi, from 3000 to 3500 psi, from 3500 to 5000 psi, from 3500 to 4000 psi, or from 4000 to 5000 psi.

In some embodiments, the first and second reactants may be introduced into the subsurface formation using coiled tubing or a drill string. In other embodiments, the first reactant may be introduced into the subsurface formation using coiled tubing or a drill string and the second reactant may be introduced into the subsurface formation through the annulus. In another embodiment, the second reactant may be introduced into the subsurface formation using coiled tubing or a drill string and the first reactant may be introduced into the subsurface formation through the annulus. This configuration allows the reactants to meet at a specified depth and be squeezed into the subsurface formation simultaneously, and avoids reaction prior to entering the subsurface formation. In some embodiments, packers may be used to ensure that the reactants enter the subsurface formation at a specified depth. By concentrating the exothermic reaction and the heat created by the exothermic reaction within the desired subsurface formation, the amount of chemicals necessary to raise the temperature and pressure of the subsurface formation to greater than the dew point may be optimized.

In some embodiments, the method may further include preventing the exothermic reaction between the reactants until introduction to the subsurface formation. For example, in some embodiments, the method may include introducing a spacer fluid into the subsurface formation after introducing the first reactant and before introducing the second reactant. Introducing the spacer fluid into the subsurface formation may include injecting the spacer fluid through the coiled tubing, the drill string, or through the annulus. Special-purpose liquids are typically prone to contamination, therefore, the spacer fluid must be compatible with both the first reactant and the second reactant. The spacer fluid may be an oil-based fluid or an aqueous solution. In some embodiments, the aqueous solution may include one or more than one of fresh water, salt water, brine, municipal water, formation water, produced water, well water, filtered water, distilled water, sea water, other types of water, or combinations of waters. In some embodiments, the aqueous solution may include water or a solution containing water and one or more inorganic compounds dissolved in the water or otherwise completely miscible with the water. In some embodiments, the aqueous solution may contain brine, including natural and synthetic brine. Brine includes water and a salt that may include calcium chloride, calcium bromide, sodium chloride, sodium bromide, other salts, and combinations of these. Various spacer fluids are contemplated based on the specific industrial application. Parameters governing the effectiveness of a spacer include flow rate, contact time, and fluid properties.

A method for increasing hydrocarbon production from a subsurface formation is also disclosed. The method includes producing a first rate of production of hydrocarbons from the subsurface formation through a wellbore and introducing a first reactant and a second reactant into the subsurface formation. The subsurface formation may be a producing subsurface formation. The first reactant and the second reactant produce an exothermic reaction that increases temperature and pressure in the subsurface formation to greater than a dew point of the condensate. Increasing the temperature and pressure in the subsurface formation to greater than the dew point of the condensate vaporizes and thereby reduces condensate in the subsurface formation. Then, after introducing the first reactant and the second reactant, the method further includes increasing hydrocarbon production from the subsurface formation by producing a second rate of production of hydrocarbons from the subsurface formation. The second rate of production of hydrocarbons may be greater than the first rate of production of hydrocarbons.

EXAMPLES

The following examples illustrate features of the present disclosure but are not intended to limit the scope of the disclosure.

Example 1

FIG. 1 shows an example exothermic reaction of one liter of an aqueous solution including 3 mole (mol) (255 grams (g.)) sodium nitrite and 3 mol (160 g.) ammonium chloride. Sodium nitrite and ammonium chloride are available from Sigma Aldrich. This experiment was conducted using a 3-liter C-276 autoclave system available from Autoclave Engineers. Referring to FIG. 1, curve 1 shows the relationship of pressure over time and curve 2 shows the relationship of temperature over time throughout the exothermic reaction. The generated heat and pressure increased significantly from 68° F. and 14.7 psi, respectively, to 600° F. and 3,470 psi, respectively, over the span of 50 minutes (min).

Example 2

Figure 2:
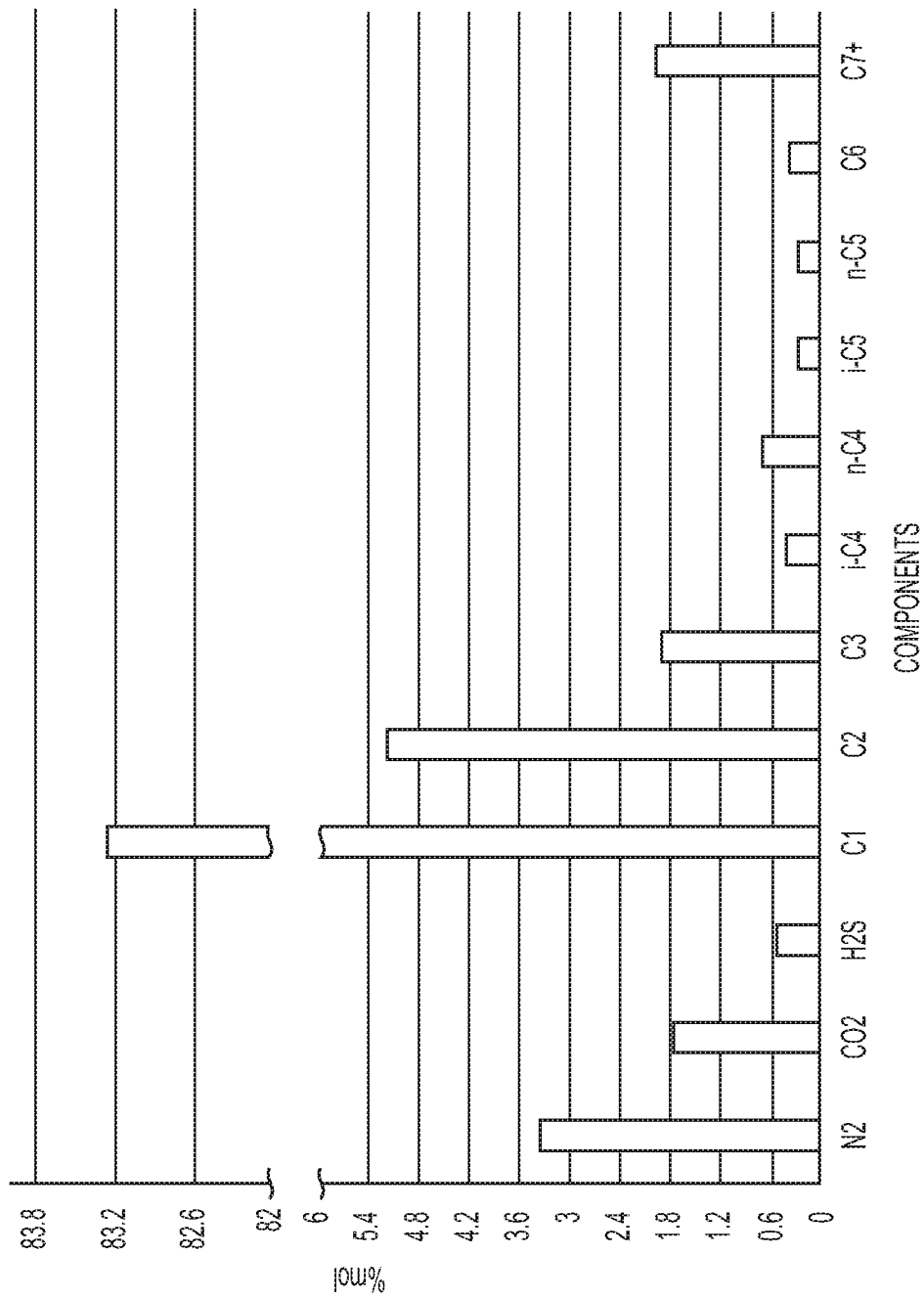
FIG. 2 graphically depicts the molar percentage (mol %) (y-axis) of a hydrocarbon composition (x-axis), according to one or more embodiments described in this disclosure.

Phase behavior simulation was conducted to determine pressure and temperature values in a simulated exothermic reaction condensate treatment at reservoir conditions using the WinProp phase behavior and fluid property computer software program available from Computer Modelling Group Ltd, headquartered in Calgary, Alberta, Canada, with regional offices in Texas, Colombia, Brazil, Mexico, Dubai, London, Malaysia, Russia, India, China, and Indonesia. In this simulated exothermic reaction condensate treatment, typical reservoir fluids were used. Tables 1, 2, and 3 list the composition of the reservoir fluid used in the phase behavior simulation. FIG. 2 shows the compositional distribution of reservoir fluids used in these examples.

TABLE 1

Reservoir Fluid Composition

| Component | mol % |
|---|---|
| $N_2$ | 3.349 |
| $CO_2$ | 1.755 |
| $H_2S$ | 0.529 |
| $C_1$ | 83.265 |
| $C_2$ | 5.158 |
| $C_3$ | 1.907 |
| $i\text{-}C_4$ | 0.409 |
| $n\text{-}C_4$ | 0.699 |
| $i\text{-}C_5$ | 0.28 |
| $n\text{-}C_5$ | 0.28 |
| $C_6$ | 0.39 |
| $C_{7+}$ | 1.98 |
| Total | 100.00 |

TABLE 2

Calculated Properties of the Heptane Plus ($C_{7+}$)

| | mol % | Molecular Weight, Dalton (u) | Critical Temperature, Rankine (° R) | Critical Pressure, psi | Acentric Factor |
|---|---|---|---|---|---|
| $C_{7+}$ | 1.98 | 138.700 | 1127.640 | 373.210 | 0.398801465 |

TABLE 3

Calculated Properties of the Heptane Plus ($C_{7+}$)

| Reservoir Pressure | 5135 psi |
|---|---|
| Condensate Gas Ratio | 33.49 stock tank barrel per million standard cubic foot (STB/MMscf) |

TABLE 3-continued

Calculated Properties of the Heptane Plus ($C_{7+}$)

| Stock Tank Oil Density | 47.82 pound mass per cubic foot (lbm/ft³) |
|---|---|
| Stock Tank Oil API | 53.02° |
| Stock Tank Oil Viscosity | 1.39 cP |
| Reservoir Temperature | 220° F. |

Figure 3:
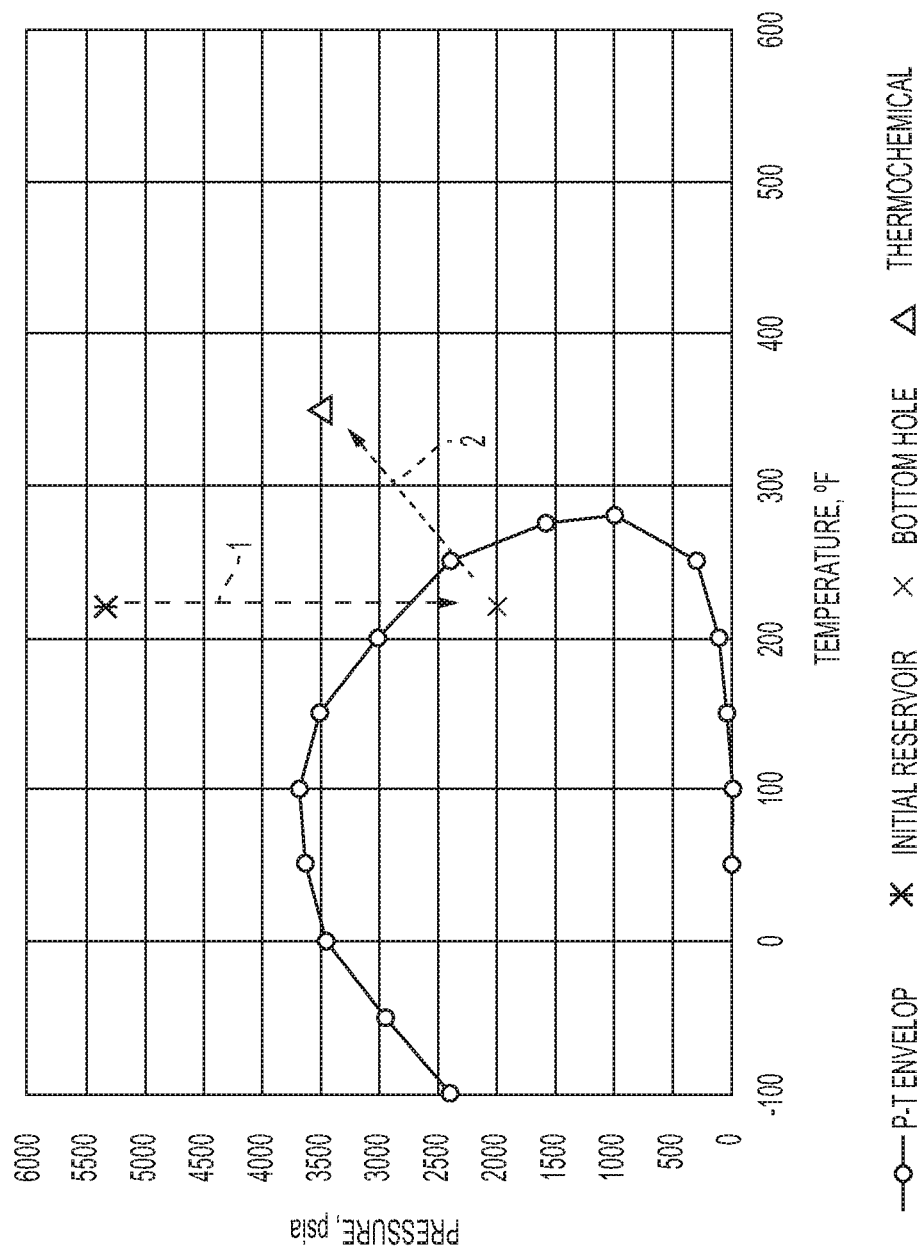
FIG. 3 graphically depicts the phase envelope of a hydrocarbon composition as it depends on pressure (y-axis) and temperature (x-axis), according to one or more embodiments described in this disclosure.

FIG. 3 summarizes the effect of the simulated exothermic reaction condensate treatment on removing the condensate. Initially, at a pressure of 5315 psi and a temperature of 220° F., there was only dry gas and no liquid was present in the reservoir. However, as hydrocarbons were produced from the reservoir, as shown by line 1, reservoir pressure decreased to less than the dew point pressure, so that the reservoir had a pressure of 2000 psi and a temperature of 220° F. The P-T envelope curve shows the pressure and temperature dew point curve for the reservoir fluid composition used in this experiment, as shown in Tables 1, 2, and 3 and FIG. 2. Referring again to FIG. 3, when the reservoir pressure fell to less than the dew point pressure, condensate began to develop and accumulated near the wellbore. A reactant solution, comprising sodium nitrite and ammonium chloride, was then injected into the reservoir, as shown by line 2, which increased the reservoir pressure and temperature to 3500 psi and 350° F., respectively. This point was outside of the P-T envelope, and resulted in removing the condensate banking by vaporizing the condensate, thereby enhancing hydrocarbon production.

Example 3

Figure 4:
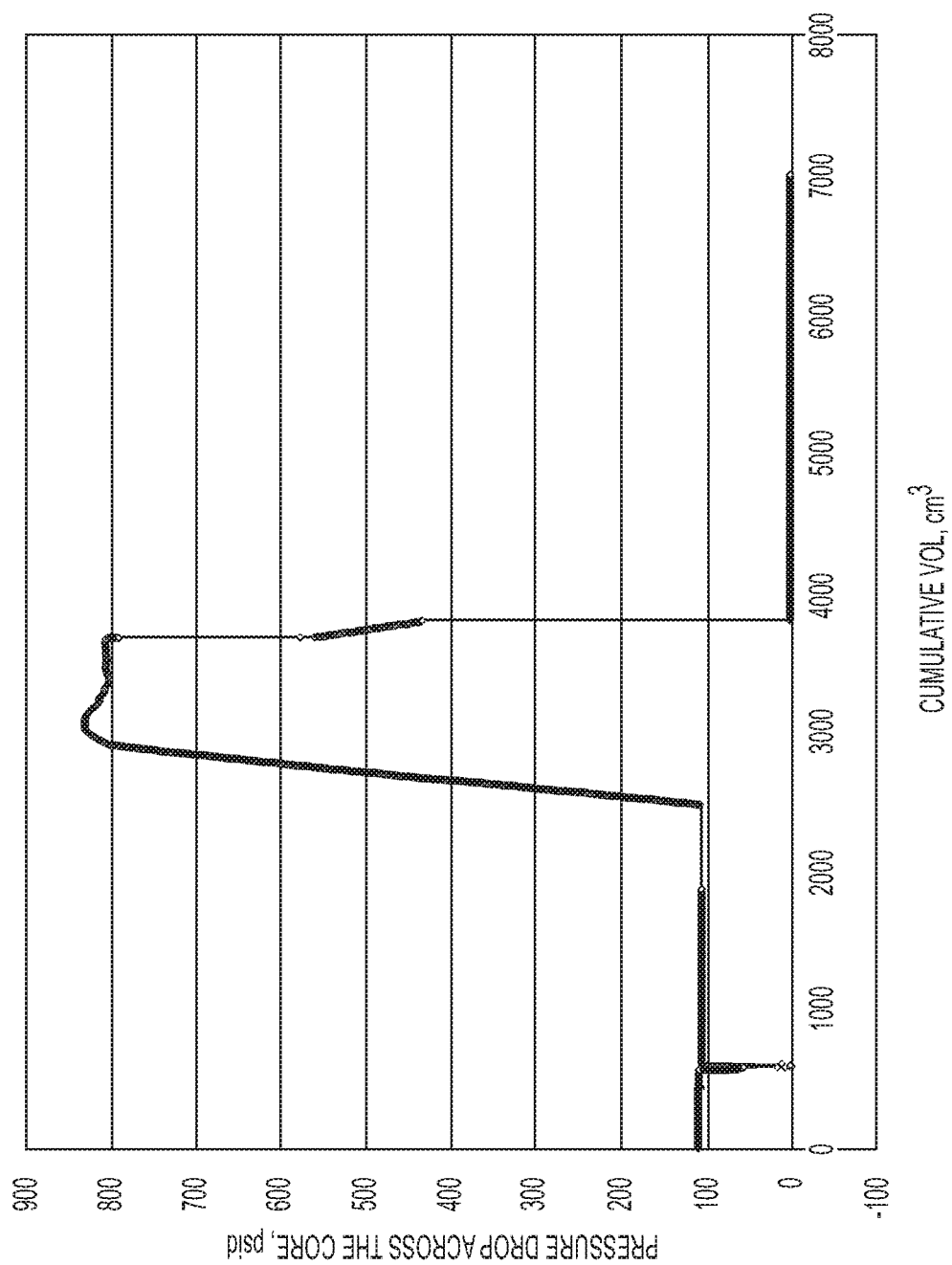
FIG. 4 graphically depicts the relationship between pressure drop (y-axis) and cumulative volume (x-axis) during a coreflood experiment in which a core sample was injected with a reactant solution, according to one or more embodiments described in this disclosure.

Example exothermic reactions were conducted on a core sample using a coreflooding system. FIG. 4 shows the pressure drop across the core sample as a function of the cumulative volume of fluid injected into the core sample throughout the experiment. To begin the experiment, brine was injected into the core sample at a rate of 1 cubic centimeter per minute (cm³/min) and the brine permeability of the core sample was measured and determined to be 0.45 mD. Then, approximately 5 to 10 pore volume of a reactant solution including sodium nitrite and ammonium chloride was injected into the core sample, which resulted in a pressure drop across the core of approximately 800 psid. Then, brine was injected into the core sample a second time, again at a rate of 1 cm³/min. Pressure drop across the core was greatly increased during the reactant solution injection, confirming the generation of pressure. The brine permeability of the core sample was increased from 0.45 mD to 118.47 mD, an increase of 118.02 mD. The porosity of the core sample was increased from 0.7% to 2.7%, an increase of 2% total porosity. In other words, the initial porosity of the core sample was increased by 286%. Permeability and porosity were greatly improved, micro-fractures were created, and conductivity was increased throughout the core sample. This experiment was again run on a core sample with an initial porosity of 13.22%. After treatment, the porosity of the core sample was increased from 13.22% to 14.2%, an increase of 1% total porosity. In other words, the initial porosity of the core sample was increased by 7.5%.

Example 4

A core sample with an air permeability of 0.005 nanoDarcys was chemically treated using a coreflooding system available from Core Laboratories. A solution including sodium nitrite and ammonium chloride was injected through a 0.5 inch diameter drilled hole within the core sample. The diameter of the core sample was 1.5 inches, the total core sample length was 3.2 inches, and the core sample had an initial porosity of 1.35%. Due to the reactant solution, micro-fractures were created along the core sample.

MR-CT Microscopy utilizes nuclear magnetic resonance (NMR) combined with X-ray computed tomography to measure the pore size distribution of a core sample. NMR allows observing microscopic events within reservoir porous media, such as core samples, and provides fluid-rock interaction with proper mineralogy quantification information. Estimates of permeability can be obtained by using NMR data along with empirical correlations. Water within a rock contains protons which have a net magnetic moment and spin. When subjected to the NMR static magnetic field, $B_o$, these protons align parallel to the applied field. When the protons are tipped at 90° to $B_o$, they attempt to realign with $B_o$ with a speed, or relaxation time, that is proportional to the size of the cavity, or pore, in which the protons are located. An NMR machine comprises permanent magnets, also referred to as pole pieces, a radio frequency transmitter, and a radio frequency receiver and amplifier. The static magnetic field is generated by the pole pieces. Pulsing the radio frequency transmitted induces an orthogonal field. The return of the oriented protons to the original field is detected by the receiver coil. The entire assembly is housed in a temperature controlled enclosure, and the core sample is conventionally placed in the most uniform portion of the static magnetic field. Pulsing the transmitter coil applies a secondary magnetic field, $B_t$, perpendicular to the $B_o$ static magnetic field. Sufficient pulse duration causes the protons to tip in a direction 90° to $B_o$ in the $B_t$ or transverse direction. When the pulse is removed, the protons begin to precess. Precession is a change in the orientation of the rotational axis of a rotating body. A series of 180° pulses are used to realign the precessing protons; however, the pulse cannot align those protons which are out of the plane or which have relaxed. Brownian motion and surface relaxation cause the protons to fall from the plane or become relaxed through contact with a mineral surface. Thus, subsequent realignment pulses result in a gradually reduced realigned strength. As fewer and fewer protons realign, the signal strength decays in the $B_t$ direction. It can be shown that diffusion and Brownian motion result in a decay which is slow compared to surface relaxivity. Measurement times take seconds, in that time water molecules diffuse. The distance traveled by a water molecule in 1 second can be computed from:

$$x_2 = 6Dt \qquad \text{EQUATION 3}$$

where D is the molecular diffusion constant for water: $D = 2 \times 10^{-5}$ cm$^2$/sec. Therefore, the likelihood of a proton coming in contact with a mineral surface increases as the cavities become smaller. Thus, water in small cavities has a shorter relaxation time than water in large cavities. When surface relaxivity dominates, the rate of signal decay is inversely proportional to the size of the cavity, or pore, in which the protons reside. Large signals at very short times are interpreted as coming from small pores. The recorded signal, a relaxation curve, is interpreted as the sum of a series of relaxation time calculated by:

$$\frac{1}{T_2} = \frac{\rho_r}{a} \qquad \text{EQUATION 4}$$

where $T_2$ is the relaxation time, $\rho_r$ is the surface relaxivity, a property dependent upon mineralogy, and a is a characteristic dimension of the pore, typically taken as r, the radius. Thus, for a monomineralic rock, the relaxation time of a fluid in a spherical pore is proportional to 1/r, where r is the radius of the pore. The amplitude of each individual relaxation time is associated with the volume associated with cavity, or pore. The ensemble of amplitudes plotted against $T_2$ relaxation time is a $T_2$ relaxation spectrum. The spectrum is a reflection of the variation of pore sizes. The sum of the amplitudes, or incremental porosities, is the sum of fluid in the rock, which, when the core sample is 100% saturated with water, represents the porosity of the core sample.

Figure 5:
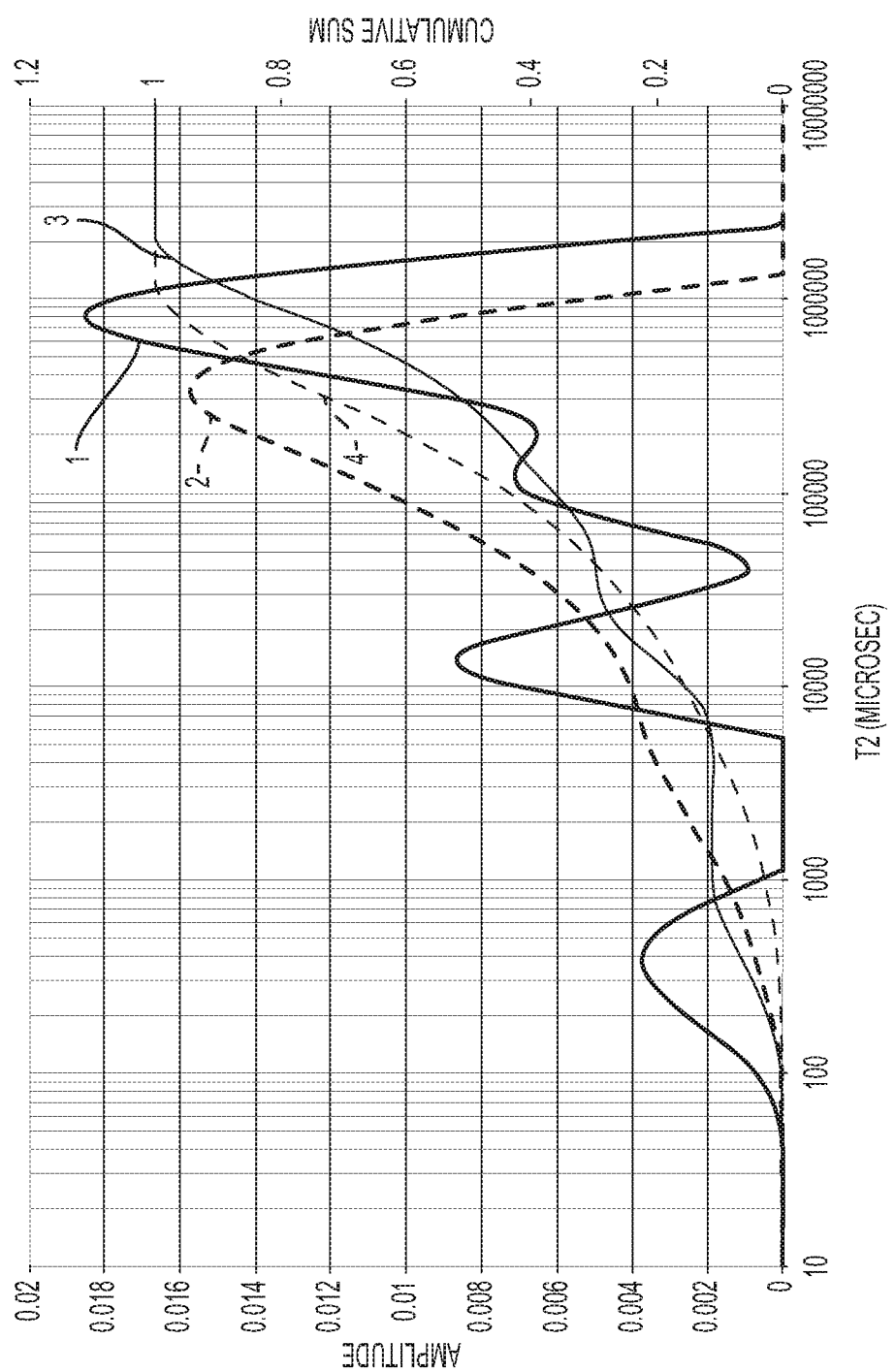
FIG. 5 graphically depicts the pore size distribution and the (cumulative pore size) of a core sample before and after a coreflood experiment in which a core sample was injected with a reactant solution, according to one or more embodiments described in this disclosure.

In this experiment, MR-CT Microscopy was performed on a core sample before and after the simulated downhole exothermic reaction condensate treatment. The exothermic reaction treatment led to the initiation of micro-cracks and pores in the rock samples. Referring to FIG. 5, the $T_2$ relaxation curve is plotted, with the $T_2$ relaxation time shown in microseconds (μsec) on the x-axis, the amplitude (relating to curves 1 and 2) shown on the left y-axis, and the cumulative sum of the amplitudes (relating to curves 3 and 4) shown on the right y-axis. Curve 1 represents the pore size distribution before the treatment, and curve 2 represents the pore size distribution after the treatment. Curve 1 shows three peaks with different pore size distribution, micro pores (100 to 1000 μsec), miso pores (10,000 to 100,000 μsec) and macro pores (100,000 to 1,000,000 μsec). These separated peaks indicate isolated porosity between the three sizes of pores. After treatment, as shown in curve 2, only one large peak is shown, indicating that communication between the different pore sizes has increased, leading to greater conductivity within the core sample after the treatment.

Curve 3 represents the cumulative amplitude, or pore size, before the treatment, and curve 4 represents the cumulative amplitude, or pore size, after the treatment. Curve 4 is shifted to the left in comparison to curve 3, indicating that the treatment created micro fractures, thereby changing the pore system geometry, leading to greater conductivity within the core sample after treatment. Therefore, the treatment enhanced the fluid communication between the different pore sizes within the core sample, thereby improving the absolute permeability of the core sample. A visual inspection of the X-ray computed tomography images before and after the treatment showed a visual increase in the porosity and permeability of the core sample.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method for reducing condensate in a subsurface formation, the method comprising:
   introducing a first reactant and a second reactant into the subsurface formation, wherein the first reactant and the second reactant produce an exothermic reaction that increases temperature and pressure in the subsurface formation to greater than a dew point of the condensate, wherein:
      increasing the temperature and pressure in the subsurface formation to greater than the dew point of the condensate vaporizes and thereby reduces condensate in the subsurface formation; and
      the exothermic reaction forms microfractures within the subsurface formation, thereby reducing condensate banking formation; and
   introducing a buffer solution with the first and second reactants into the subsurface formation, in which the buffer solution comprises at least one of monopotassium phosphate, N-cyclohexyl-2-aminoethanesulfonic acid, and borate.

2. The method of claim 1, in which introducing the first reactant and the second reactant into the subsurface formation comprises introducing each reactant into the subsurface formation separately.

3. The method of claim 2, in which introducing the first reactant and the second reactant into the subsurface formation comprises introducing the first reactant into the subsurface formation through coiled tubing and introducing the second reactant into the subsurface formation through an annulus of a wellbore.

4. The method of claim 1, in which introducing the first reactant and the second reactant into the subsurface formation comprises introducing a mixture comprising the first reactant and the second reactant into the subsurface formation.

5. The method of claim 1, in which the method further comprises introducing $N_2$ with the first reactant and the second reactant into the subsurface formation.

6. The method of claim 1, in which at least one of the first reactant and the second reactant comprises a salt hydrate.

7. The method of claim 1, in which the first reactant and the second reactant are chosen from the group consisting of $MgSO_4 \cdot 7H_2O$, $Al_2SO_4 \cdot 18H_2O$, $MgCl_2 \cdot 6H_2O$, $CaCl_2 \cdot 2H_2O$, $NaNO_2$, and $NH_4Cl$.

8. The method of claim 1, in which the first reactant comprises $NaNO_2$ and the second reactant comprises $NH_4Cl$.

9. The method of claim 1, in which the pressure ranges from 3,500 psi to 10,000 psi.

10. The method of claim 1, in which the temperature ranges from 300° F. to 750° F.

11. The method of claim 1, in which a heat capacity of each reactant is greater than 8,000 J/kg° C.

12. The method of claim 1, in which the exothermic reaction produces from 100,000 to 200,000 kJ per barrel of total reactant.

13. The method of claim 1, in which the dew point comprises:
   a dew temperature ranging from 100° F. to 300° F.; and
   a dew pressure ranging from 1500 psi to 4000 psi.

* * * * *